United States Patent [19]

Heesch

[11] Patent Number: 4,601,517

[45] Date of Patent: Jul. 22, 1986

[54] INTEGRAL SEAT FRAME AND TRACK

[75] Inventor: Max O. Heesch, Ypsilanti, Mich.

[73] Assignee: ITT Corporation, New York, N.Y.

[21] Appl. No.: 649,191

[22] Filed: Sep. 10, 1984

[51] Int. Cl.⁴ .............................................. A47C 7/02
[52] U.S. Cl. .................................... 297/452; 248/429; 248/430
[58] Field of Search ...................... 248/429, 430, 424; 308/6 R, 3 R, 3.6; 296/65 R; 297/452, 318

[56] References Cited

U.S. PATENT DOCUMENTS

| 4,252,382 | 2/1981 | Thomas | 312/341 R |
| 4,304,384 | 12/1981 | Cremer | 248/424 X |
| 4,492,408 | 1/1985 | Lohr | 248/424 X |
| 4,515,404 | 5/1985 | Nishimura | 248/429 X |

FOREIGN PATENT DOCUMENTS 2457786  1/1981  France ................................ 248/429

Primary Examiner—James T. McCall
Attorney, Agent, or Firm—James B. Raden; Donald J. Breh

[57] ABSTRACT

An integral seat frame and track is provided. Two base tracks comprising elongated structural elements are mounted to a vehicle floor in a spaced, parallel relationship. A seat frame assembly comprises two spaced, parallel structural elments joined at one end of each by a third structural element. The parallel elements of the seat frame assembly are adapted to fit cooperatively with the seat tracks so that the seat frame is movable along the seat tracks. The seat frame elements include provision to receive seat support members that are stretched between the seat frame elements. A flange extends outwardly and downwardly from each seat frame element and is adapted to support a seat cover stretched over its edges. Seat back supports are affixed to each seat frame parallel element.

7 Claims, 4 Drawing Figures

INTEGRAL SEAT FRAME AND TRACK

BACKGROUND OF THE INVENTION

The present invention relates to an automotive seat track assembly and, more particularly, to an integral seat frame and track.

In known seat track assemblies, a base rail assembly is affixed to the floor of a vehicle. A slide assembly comprising complementary tracks is positioned with the base rails so as to be moveable forwardly and rearwardly along the base rails. A seat frame comprising side members joined by cross members is mounted to the slide assembly to enable the seat to be moved with the slide assembly. The seat frame includes seat back supports to which the seat back is mounted. The seat frame is a fairly heavy reinforced structural assembly as it must support seat back loads which occur during a vehicle collision. The seat frame also receives seat support members which usually comprise springs stretched across the seat frame members. The combination of the slide assembly and the seat frame is fairly complex and costly to manufacture and is, in most embodiments, a fairly heavy assembly. It is always a design criteria for automobiles to decrease weight wherever possible and especially where no decrease in strength or service life accompanies such decrease in weight.

Accordingly, it is an object of the present invention to provide seat track assembly of simplified design and decreased weight having an integral seat frame and track.

SUMMARY OF THE INVENTION

The present invention provides an integral seat frame and track assembly. Two spaced, parallel base rails are mounted to the floor of a vehicle. Such mounting is usually accomplished by bolting feet which extend from the base rails to the floor or frame of the vehicle. Such base rails usually comprise channel structural members having upper and lower legs extending outwardly from a base section. In one embodiment of the present invention, the legs of such base rail members face inwardly toward each other when such base rails are mounted.

The seat frame and track assembly is an integral assembly adapted to slide along the base rails to allow forward and rearward seat movement and also to receive seat supports therein. The seat frame comprises two side structural elements spaced from each other and parallel to each other, joined at one end of each by a third structural element. The seat frame elements usually comprise channel structural elements. The side parallel elements are oriented so as to be complementary with the base rail channel members. Such arrangement usually comprises having the legs of the seat frame parallel channels face outwardly away from each other. Such seat frame parallel channel legs are thusly positioned above and below the legs of the base rail channels. Bearings such as ball bearings are placed between the legs of the seat frame channels and the base rail channels so as to provide improved sliding capability for the seat frame along the base rails.

The seat frame structural elements also include provision to receive seat support elements such as springs. Typically such provision includes tabs projecting from the seat frame having holes to receive the spring ends. Such provision could also include holes adapted to receive spring ends in the leg sections of the seat frame.

The seat frme structural elements also include a flange extending outwardly and then downwardly from the seat frame elements. This flange provides a means to which a seat cover can be attached and stretched across the seat. Such seat cover usually has attachment means such as hooks which can be affixed over the lower edge of the flange.

Seat back support brackets are affixed to the seat frame, usually by bolting. The seat back is affixed to these brackets. Accordingly, all seat back forces are transferred to the seat frame and, in turn, to the base rails.

Another embodiment of the present invention utilizes a separate structural member mounted over the channel shaped seat track. This member includes the means for receiving the seat support springs and has a flange extending therefrom adapted to receive hooks to hold the seat cover.

In particular, the present invention provides a seat track assembly comprising two base track members mounted in spaced, parallel relation, each base track member comprising an elongated structural member, a seat frame comprising two spaced, parallel members joined at an end of each by a third member to form the seat frame, each of said parallel members comprising an elongated structural member adapted to fit over and slide along a corresponding one of said track members thereby enabling said seat frame to slide along said base track members, bearing means located between said base track members and said parallel seat frame members and means on said parallel seat frame members adapted to receive seat support members extending between said parallel seat frame members.

DESCRIPTION OF THE PREFERRED EMBODIMENTS

Figure 1:
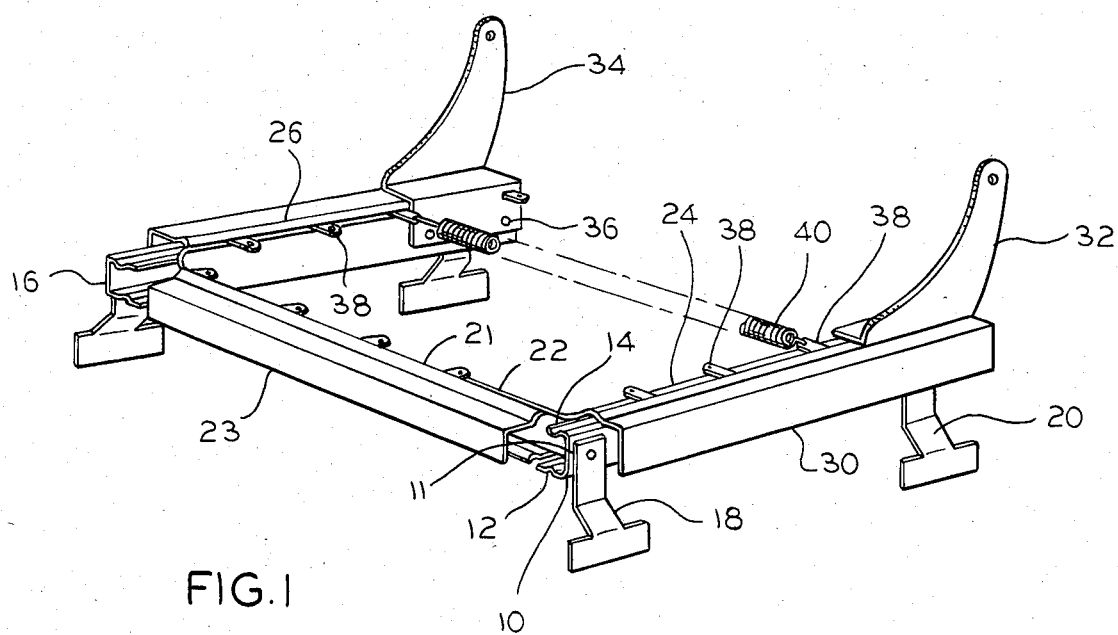
FIG. 1 is a perspective view of a seat frame and track assembly in accordance with the present invention.
Figure 2:
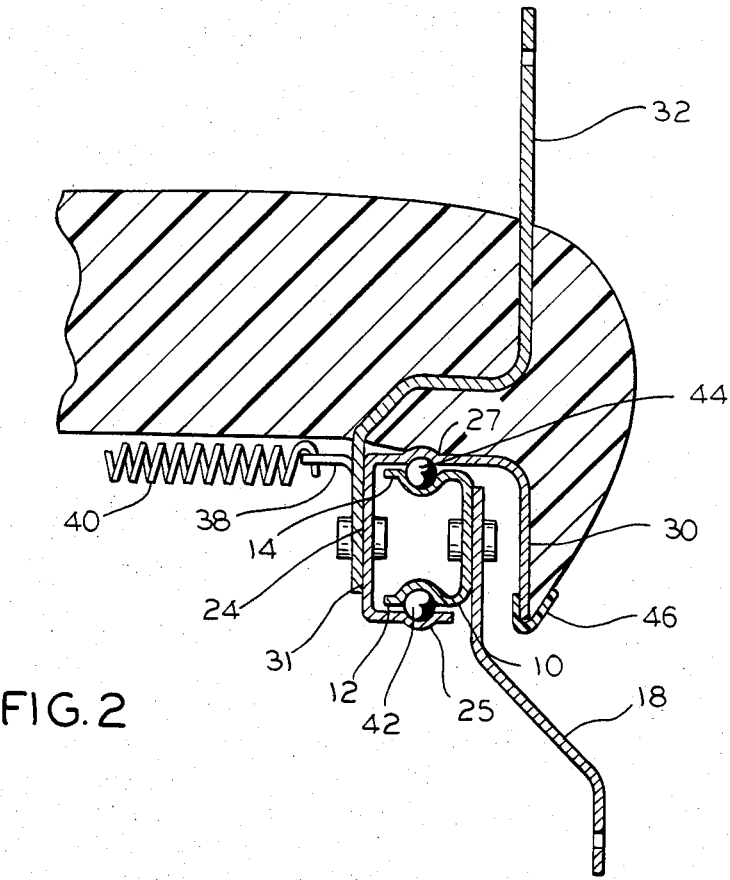
FIG. 2 is a partial cross sectional view of the seat frame and track assembly of FIG. 1, including a seat cushion and cover.

Referring now to FIGS. 1 and 2, a first embodiment of the present invention is shown. Base rails 10 and 16 are shown, with base rail 10 shown in greater detail with the understanding that base rail 16 is a mirror image of base rail 10. Base rail 10 is an elongated structural member of a generally channel shaped cross section comprising base section 11 with bottom leg section 12 and top leg section 14 extending inwardly therefrom. Base section 11 has mounting brackets 18, 20 affixed thereto which in turn are adapted to be mounted to the floor or frame of a vehicle. Mounting brackets 18, 20 can be of various shapes depending on the vehicle mounting requirements. Base rails 10 and 16 are parallel to each other with their respective leg section extending inwardly toward each other.

Seat frame and track 21 is a single assembly comprising parallel side elements 24, 26 joined at one of their ends by front element 22. Parallel side elements 24, 26 are mirror images of each other, and side element 24 will be described in detail as it is also shown in FIG. 2. Side frame side element 24 is an elongated structural element of a generally channel shaped cross section. Side elements 24 comprises a base section 31 from which top leg section 27 and bottom leg section 25 extend perpendicularly thereby forming a channel type cross section. Top leg section 27 extends beyond bottom leg section 25 and bends downwardly to form flange 30. Front element 22 also includes a similar flange 23.

Seat frame 21 is adapted to have side elements 24, 26 fit over base rails 10, 16. Ball bearings 42 are located between an indentation running the length of bottom leg 12 of rail 10 and an indentation running the length of bottom leg 25 of seat frame element 24. Ball bearings 44 are located between an indentation running the length of top leg section 27 of seat frame side element 24 and top leg section 14 of base rail 10. Such ball bearings assure the rolling of seat frame 21 along base rails 10, 16.

Tabs 38 extend inwardly from the top edges of seat frame elements 24, 26 and front element 22. These tabs have holes adapted to receive the ends of springs 40 which form the seat support elements. Also mounted to seat frame side element 24 is seat back support 32 and mounted to seat frame side element 26 is similar seat back support 34. Seat back supports 32, 34 form the entire support for the seat back. Any forces on the seat back are transfered to side elements 24, 26 and, in turn, to side rails 10, 16.

Finally, the lower edges of flange 30 of side element 24, of a similar flange of side element 26 and of flange 23 of seat frame front element 22 form an edge to receive hooks 46 which are affixed to seat cover 48. Seat cover 48 covers a foam padding material that forms the vehicle seat.

Figure 3:
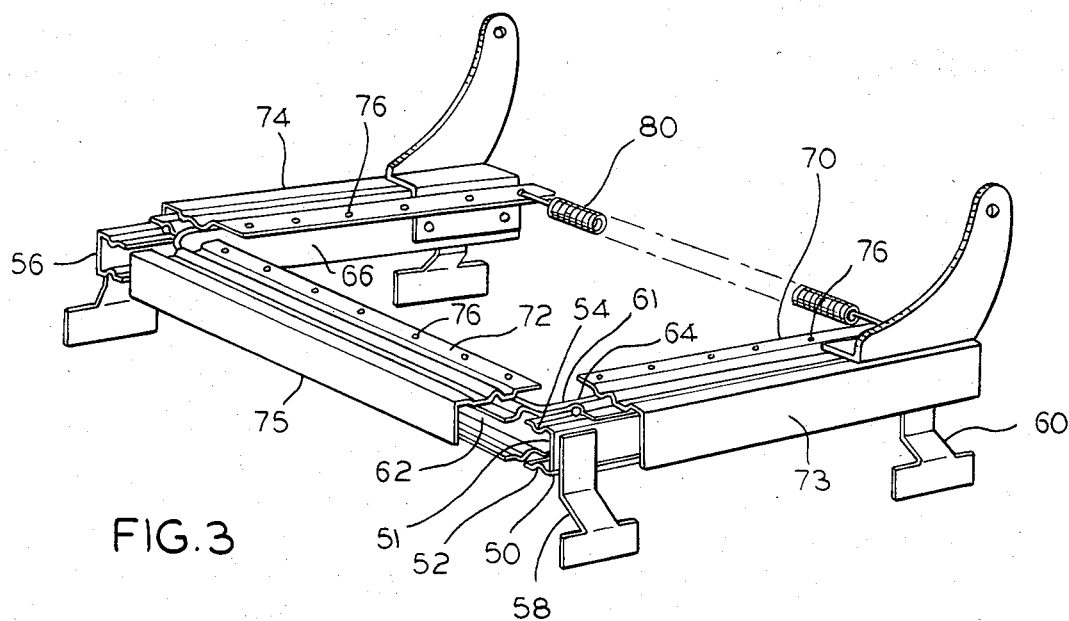
FIG. 3 is a perspective view of a second embodiment of a seat frame and track assembly in accordance with the present invention; and, FIG. 4 is a partial cross sectional view of the seat frame and track assembly of FIG. 3.
Figure 4:
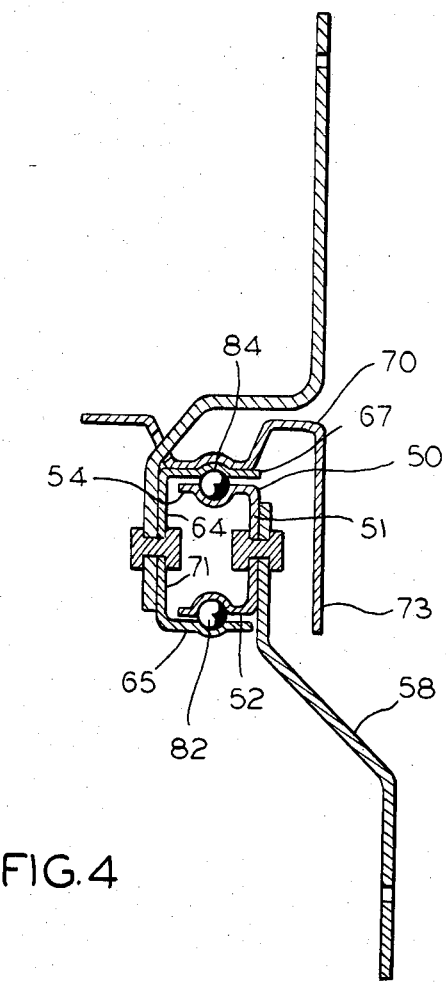

Referring now to FIGS. 3 and 4, a second embodiment of the present invention is shown. Base rails 50 and 56 are shown, with base rail 50 shown in greater detail with the understanding that base rail 56 is a mirror image of base rail 50. Base rail 50 is an elongated structural member of a generally channel shaped cross section comprising base section 51 with bottom leg section 52 and top leg section 54 extending inwardly therefrom. Base section 51 has mounting brackets 58, 60 mounted thereto which in turn are adapted to be mounted to the floor or frame of a vehicle. Mounting brackets 58, 60 can be of various shapes depending on the vehicle mounting requirements. Base rails 50, 56 are parallel to each other with their respective leg sections extending inwardly toward each other.

Seat track 61 is a single assembly comprising parallel side elements 64, 66 joined at their ends by front element 62. Parallel side elements 64, 66 are mirror images of each other, and side element 64 will be described in detail as it is also shown in FIG. 4. Side track side element 64 is an elongated structural element of a generally channel shaped cross section. Side element 64 comprises a base section 71 from which top leg section 67 and bottom leg section 65 extend perpendicularly thereby forming a channel type cross section.

An elongated generally angle shaped in cross section seat frame 70 is affixed to top leg section 67 of side element 64. A leg 73 forms part of seat frame 70 that extends parallel to base section 71 of side element 64. An elongated, generally angle shaped in cross section seat frame 72 is affixed to top leg section of front element 62. A leg 75 forms one angle section of seat frame 72. An elongated, generally angle shaped in cross section seat frame 74 is affixed to top leg section of side element 66. A leg similar to leg 73 forms an angle section of seat frame 74. All of seat frames 70, 72 and 74 have holes in their top surfaces adapted to receive the ends of seat support springs 80. The edges of legs 73, 75 and the leg of seat frame 74 are all adapted to receive a hook affixed to a seat cover for the vehicle seat.

Seat track 61 is adapted to fit over base rails 50, 56. Ball bearings 82 are located between an indentation running the length of bottom leg 52 of rail 50 and an indentation running the length of bottom leg 65 of side elements 64. Ball bearings 84 are located between an indentation running the length of top leg section 67 of seat track side element 64 and top leg section 54 of base rail 50. Such ball bearings assure the rolling of seat frame 61 along base rail 50, 56.

What is claimed is:

1. A seat track assembly comprising:
a unitary seat frame formed from a single continuous, substantially box-shaped member including an upstanding base portion, a top leg extending from said base portion, a bottom leg extending from said base portion in spaced-apart parallel relationship with said top leg having a free edge, the length of said top leg being greater than the length of said bottom leg, a flange portion depending from said top leg in spaced-apart parallel relationship with said base portion having a free edge, said flange and said bottom leg free edge defining a space therebetween;

said continuous member formed to define a pair of spaced-apart parallel side rails and a front member between said side rails with said flange defining an outer peripherial surface of said seat frame;

each of said top and bottom legs of said seat frame including a longitudinal indentation extending along the length of each of said pair of side rails, said longitudinal indentation in said top leg and said bottom leg of each of said side rails opening toward each other;

two substantially channel-shaped base members each including an upstanding base section parallel to a respective one of said base portions of said seat frame side rails, an upper leg section extending from said base section and a lower leg section extending from said base section, each of said upper and lower leg sections of each of said two base members including a longitudinal indentation, each of said base members disposed a respective one of said side rails with said indentation in said upper leg sections and said indentation in said top leg opening toward each other, said indentation in said lower leg section and said indentation in said bottom leg opening toward each other, each said base section disposed spaced apart from each said base portion of said seat frame and disposed in close proximity to said space between said free edge of said bottom leg and said flange, each said channel-shaped base section opening toward said base portion of said seat frame;

a plurality of ball-type bearings disposed between said top leg and said upper leg and between said bottom leg and said lower leg within each said indentation therein;

bracket means extending through said space between said free edge of said bottom leg of said seat frame side rails, and said flange attached to each said base section of each said base member providing for attachment of said seat-track assembly to a mounting member; and means extending from each said top leg of each said side rail portion for receiving at least one seat support member extending between said side rails.

2. The seat track assembly of claim 1 wherein:
the seat support members comprise springs.

3. The seat track assembly of claim 1 further including two seat back support brackets each affixed to one of said parallel side rails of said seat frame.

4. The seat track assembly of claim 1 further including a seat cover affixed to the free edge of the flange along the length of said parallel side rails.

5. The seat track assembly of claim 4 wherein said seat cover is affixed to the free edge of said flange along the length of said front member.

6. The seat track assembly of claim 1, wherein said bracket means includes two pairs of brackets, one pair affixed to each of said base members in spaced-apart relationship, each of said brackets being a strap-like member having one end affixed to said base position an intermediate portion extending through said space between said free edge of said bottom leg and said flange of said seat frame and a free end and adapted to be affixed to said mount member.

7. The seat track assembly as defined in claim 3, wherein said seat back support brackets are each affixed to said upstanding base portion of said seat frame.

* * * * *